3,087,954
PROCESS FOR THE PREPARATION OF
ALUMINUM ALKOXIDES
Gifford G. McClaflin, Ponca City, Okla., assignor to Continental Oil Company, Ponca City, Okla., a corporation of Delaware
No Drawing. Filed Nov. 7, 1960, Ser. No. 67,511
12 Claims. (Cl. 260—448)

This invention relates to a process for the oxidation of aluminum alkyls. In one aspect it relates to a process for the preparation of alcohols from aluminum alkyls.

In one method described in the literature, mixtures of alcohols are prepared by a process which involves the formation of aluminum alkyls, reaction of said alkyls with a low molecular weight olefin to produce growth product, oxidation of the growth product to form a mixture of alkoxides and hydrolysis of said alkoxides with a hydrolyzing agent to form an aluminum hydrolysis product and an admixture of alkanols having a wide variation in molecular weight. It has been found that partial oxidation of aluminum alkyl growth product to alkoxides, that is, oxidation of one and even two of the alkyl groups can be effected with relative ease. However, the third alkyl group often resists oxidation and this is particularly true of the higher molecular weight aluminum alkyls, for example, those containing 10 or more carbon atoms in the alkyl groups.

Complete oxidation or substantially complete oxidation of the aluminum alkyls can be effected but ordinarily requires more severe conditions and results in the formation of substantial quantities of undesired hydrocarbon products, that is, undesired paraffins and olefins.

It is an object of this invention to provide an improved process for the preparation of aluminum alkoxides and alcohols obtained from said alkoxides.

It is another object of this invention to provide an improved process for reducing the formation of undesirable hydrocarbon products in the preparation of aluminum alkoxides and alcohols produced therefrom.

Still another object of this invention is to provide an improved process for increasing the yields of alcohols from high molecular weight aluminum alkyls and aluminum alkoxides.

These and other objects of the invention will become more readily apparent from the following detailed description and discussion.

The foregoing objects are achieved broadly by reacting high molecular weight aluminum alkyls or partially oxidized aluminum alkyls at an elevated temperature with a lower molecular weight aluminum alkyl and thereafter further oxidizing the high molecular weight aluminum n-alkyls.

In one aspect of the invention, the oxidized aluminum alkyls are subjected to hydrolysis and separation to recover therefrom high molecular weight alcohols.

The method of this invention is applicable broadly to high molecular weight aluminum alkyls either individually or in admixture and also to high molecular weight aluminum alkyls which have been partially oxidized. In particular, the invention is directed to the treatment of high molecular weight aluminum alkyls which are obtained through the conversion of low molecular weight aluminum alkyls by reaction with a low molecular weight mono-1-olefin. In this method for the preparation of alcohols, an aluminum alkyl, such as triethylaluminum, is reacted with a low molecular weight olefin, such as ethylene, to form a "growth" product, said product comprising trialkylaluminum compounds in which the alkyl groups vary widely in molecular weight. The growth reaction can be illustrated equationwise as follows:

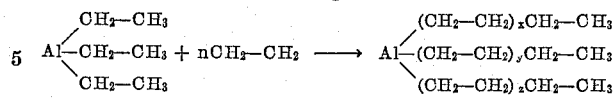

wherein $x$, $y$, and $z$ represent integers ranging from 0 to about 28 and $x+y+z=n$. The growth reaction is carried out by passing ethylene through triethylaluminum, preferably in the presence of a diluent under a wide variety of reaction conditions for example, 65 to 155° C. and 200 to 5,000 p.s.i.g., preferably 90 to 120° C. and 1,000 to 3,500 p.s.i.g. Although triethylaluminum is the preferred reactant, other low molecular weight aluminum alkyls, such as tripropylaluminum, tributylaluminum, triisobutylaluminum, diethylaluminum hydride, ethylaluminum dihydride, etc., can be employed.

It has been found that the growth reaction provides a statistical distribution of alkyl chain lengths characterized by the Poisson relationship, which can be expressed as follows:

$$P_{(n)} = \frac{m^n e^{-m}}{n!}$$

wherein $P_{(n)}$ represents the probability that a certain hydrocarbon radical will be formed by $n$ addition of ethylene to the aluminum-ethyl bond originally present and $m$ is the mean number of additions of ethylene per growing chain. An example of the type of distribution which is obtained in the growth reaction is presented in the following table:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

This growth product can be converted partially or entirely to the corresponding aluminum alkoxides by reaction with oxygen (air) usually at a temperature from about 20 to about 100° C. and a pressure from about 10 to about 60 p.s.i.g. By appropriately controlling the quantity of air and the reaction conditions, including the time of reaction, any of the alkyl groups of the aluminum alkyls can be converted to alkoxides.

The growth product which is treated within the method of this invention comprises aluminum alkyls of high molecular weight, that is, material having an $m$ value as hereinbefore defined of at least about 5 and preferably from about 10 to about 20. Materials of higher $m$ value can, of course, also be employed, if desired.

The low molecular weight aluminum alkyls which are employed in the process of this invention are those materials which are considered to be hydride formers, that is, aluminum alkyls which are unstable under the conditions employed in the process. These materials include aluminum n-alkyls such as aluminum triethyl, aluminum tripropyl, aluminum tributyl, aluminum trihexyl, etc., and aluminum isoalkyls such as aluminum isopropyl, aluminum isobutyl, aluminum isopentyls and the like. Preferably the aluminum alkyls are selected from those containing from 1 to about 6 carbon atoms. They are not, however, limited to any particular number of carbon atoms, the only prerequisite being that the alkyl groups are of lower molecular weight than the alkyl groups in the aluminum alkyl growth product or other higher molecular weight aluminum alkyls which are being treated.

As stated above, the low molecular weight aluminum alkyls are those which are unstable at the reaction conditions employed in the process. For example, the aluminum isoalkyls are usually unstable at temperatures in the range between about 65 and 150° C., the particular temperature required depending on the specific aluminum compound. The aluminum n-alkyls are more stable than the iso compounds and usually require somewhat higher temperatures, i.e., in the range of between about 100 and 200° C. Here again, the particular temperature employed will depend on the specific aluminum n-alkyl.

Also included within the scope of the low molecular weight aluminum alkyls are the hydrides which they form during the process. These can be either mono or dihydrides, for example, in addition to aluminum triisobutyl there can be used in the process aluminum diisobutyl hydride and aluminum isobutyl dihydride. The aluminum alkyls are perhaps best defined by the following formula:

wherein R and $R_1$ are selected from the group consisting of hydrogen and alkyl and $R_2$ is alkyl.

The amount of aluminum alkyl of lower molecular weight which is employed in carrying out the process usually is at least the stoichiometric quantity required to react with unoxidized alkyl groups in the aluminum growth product. Of course lesser amounts than stoichiometric can be employed but with less desirable results. Preferably an excess of the lower molecular weight aluminum alkyl usually up to about 100 percent in excess of stoichiometric is provided in the reaction system.

The reaction between the high molecular weight aluminum alkyls or partially oxidized high molecular weight aluminum alkyls with the low molecular weight aluminum compounds is carried out at the temperatures hereinbefore set forth and for a period of time which can vary from less than 1 hour to as high as about 48 hours or higher and preferably between about 6 and about 24 hours. Following this, the reaction product is further subjected to oxidation with oxygen (air) under the conditions previously set forth. This oxidation can be carried out to any additional extent desired and ordinarily is sufficient to provide substantially complete oxidation of the high molecular weight aluminum alkyls.

The aluminum alkoxides which are formed in the oxidation step are hydrolyzed by contacting them with a conventional hydrolyzing agent, for example, a mineral acid, such as sulfuric acid or hydrocarbon acid, water, steam, or various bases, such as sodium hydroxide, potassium hydroxide, and the like. Hydrolysis is usually carried out between a range of temperature between about 25 and 125° C., with the hydrolyzing agent being employed usually in an amount sufficient to provide an excess above stoichiometric from about 2 to about 200 percent. Following hydrolysis, the alcohols can be separated from the other reaction products and resolved by distillation or other suitable procedures to provide individual alcohols or alcohol fractions.

It is believed that the advantages which are obtained by the method of the invention are due to the fact that high molecular weight aluminum alkyls resist complete oxidation due to steric hindrance caused by the three bulky alkyl groups. It is possible that by causing one of these groups to be displaced to another aluminum atom by employing the method of this invention, a more easily oxidizable molecule is obtained.

In the preparation of the high molecular weight aluminum alkyl growth product as discussed hereinbefore, high molecular weight olefins are obtained as by-products and usually remain in part in the growth product, even when the growth product is subjected to distillation or other separation procedures. As a further possible reaction, in the method of this invention, these olefins may react with the low molecular weight aluminum alkyl to provide an aluminum alkyl of greater molecular weight which is then converted to the alkoxide in the subsequent oxidation procedure.

In any event, whatever the correct theory or theories, the method of this invention provides a substantial improvement in that the quantities of undesirable products obtained in the process, that is, saturated hydrocarbons and olefins are substantially reduced, and the quantities of desired alcohol products are increased.

The following examples are presented in illustration of the invention:

High molecular weight aluminum alkyl was prepared by growing aluminum triethyl with ethylene at a temperature of about 120° C. and a pressure of about 1,500 p.s.i.g. for a period of time sufficient to provide a product having an $m$ value of 14. Olefins formed along with the growth product were present therein as undesirable by-products.

*Example 1*

249 grams of the growth product prepared above was added to a 1-liter, 3-necked flask which had been thoroughly dried and flushed with nitrogen. The flask and contents were then heated to 100° C. 50 ml. (40 grams) of aluminum triisobutyl in 150 ml. of toluene was added slowly from a dropping funnel. The system was kept free of oxygen and water by means of an exit line leading to a cold trap mounted in a Dry-Ice-acetone bath.

The exit end of the trap was connected to a wet test meter. Following the aluminum triisobutyl addition, the mixture was poststirred at 100–110° C. for three hours. The material was allowed to stand overnight and was then diluted with 100 ml. of dry toluene and oxidized with dry air for seven hours at 50–60° C. The oxidized material was allowed to stand overnight and was then hydrolyzed in 500 ml. of 25 percent sulfuric acid. The hydrolyzed material was water-washed until neutral to litmus and then heated to 170° C. at house vacuum (approximately 25 inches of mercury) to yield 501 grams of residue which had a freezing point of 71° C. and when analyzed by alumina adsorption showed only 26.3 percent hydrocarbon (olefins and saturated hydrocarbon).

*Example 2*

Another portion of the same growth product employed in Example 1, when oxidized under the same conditions as Example 1 with the aluminum triisobutyl treatment omitted, yielded a product containing 44.3 percent hydrocarbon and possessing a melting point of 66° C.

*Example 3*

207 grams of the oxidized growth product of Example 2 was mixed with 40 grams (0.20 mole) of aluminum triisobutyl containing some aluminum hydride bonds. The mixture was refluxed at 110° C. for 18 hours and then oxidized at 50–70° C. with air at the rate of 32.5 liters per hour for 8 hours. After standing overnight at room temperature, the oxidized material was hydrolyzed in 25 percent hydrochloric acid, washed with distilled water until natural, and then heated under a vacuum of 3.5 mm. at 145° C. to remove the solvent.

The crude alcohol was analyzed by alumina chromatography and found to contain 20.2 percent hydrocarbon.

*Example 4*

Another portion of aluminum alkyl growth product used in Example 1 was oxidized following the procedure of Example 2 and, when hydrolyzed, gave a product containing 44.2 percent hydrocarbon.

*Example 5*

A 100-gram sample of the oxidized growth product from Example 4 was charged to a one-liter, three-necked flask and diluted with 150 ml. of dry toluene.

The mixture was heated to 100° C. with stirring and aluminum diisobutyl hydride 36 ml.; 29.4 grams in 50 ml. of dry toluene was slowly added to the aluminum alkoxide. The mixture was held at toluene reflux 110° C. for 22 hours. The temperature was lowered to 55° C. and oxidation was started. Oxidation was continued for 8 hours. Mixture was allowed to stand overnight (16 hours) and was then hydrolyzed in 1,000 ml. of 25 percent hydrochloric acid. Hydrolyzed material was water-washed until neutral and then heated to 200° C. of 4 mm. of pressure to give 86.6 grams of residue, possessing a melting point of 81° C. and when analyzed by alumina adsorption was found to contain 24.8 percent hydrocarbon.

It is noted from the preceding examples that treatment of either high molecular weight growth product or partially oxidized high molecular weight growth product in accordance with the method of this invention substantially reduces the yield of undesired side products and correspondingly substantially increases the yield of alcohols.

Having thus described the invention by providing specific examples thereof, it is to be understood that no undue limitations or restrictions are to be drawn by reason thereof and that many variations and modifications are within the scope of the invention.

I claim:

1. In a process for oxidizing high molecular weight aluminum n-alkyls having the formula

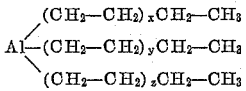

wherein $x$, $y$, and $z$ are integers ranging from zero to about 28 and wherein said n-alkyls have an "$m$" value of at least 5 as defined by the Poisson relationship, the improvement which comprises reacting said n-alkyls at an elevated temperature with a lower molecular weight aluminum alkyl having the formula

wherein R and $R_1$ are selected from the group consisting of hydrogen and alkyl groups having 1–6 carbon atoms, and $R_2$ is an alkyl group having 1–6 carbon atoms, and thereafter oxidizing the reaction product to form aluminum alkoxides.

2. The process of claim 1 in which the lower molecular weight aluminum alkyl is aluminum triisobutyl.

3. The process of claim 1 in which the lower molecular weight aluminum alkyl is aluminum diisobutylhydride.

4. The process of claim 1 in which the "$m$" value of said n-alkyls is about 10–20.

5. The process of claim 4 in which the lower molecular weight aluminum alkyl is aluminum triisobutyl.

6. The process of claim 4 in which the lower molecular weight aluminum alkyl is aluminum diisobutylhydride.

7. In a process for oxidizing high molecular weight aluminum n-alkyls having the formula

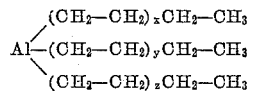

wherein $x$, $y$, and $z$ are integers ranging from zero to about 28 and wherein said n-alkyls have an "$m$" value of at least 5 as defined by the Poisson relationship, the improvement which comprises oxidizing said n-alkyls to form partially-oxidized n-alkyls, reacting said partially-oxidized n-alkyls with a lower molecular weight aluminum alkyl having the formula

wherein R and $R_1$ are selected from the group consisting of hydrogen and alkyl groups having 1–6 carbon atoms, and $R_2$ is an alkyl group having 1–6 carbon atoms, and thereafter further oxidizing the reaction product of said partially oxidized n-alkyls and said lower molecular weight aluminum alkyl to form aluminum alkoxides.

8. The process of claim 7 in which the lower molecular weight aluminum alkyl is aluminum triisobutyl.

9. The process of claim 7 in which the lower molecular weight aluminum alkyl is aluminum diisobutylhydride.

10. The process of claim 7 in which the "$m$" value of said n-alkyls is about 10–20.

11. The process of claim 10 in which the lower molecular weight aluminum alkyl is aluminum triisobutyl.

12. The process of claim 10 in which the lower molecular weight aluminum alkyl is aluminum diisobutylhydride.

References Cited in the file of this patent

UNITED STATES PATENTS 2,987,535    Mirviss _____ June 6, 1961